United States Patent
Ernst et al.

(10) Patent No.: US 10,902,683 B2
(45) Date of Patent: *Jan. 26, 2021

(54) REPRESENTATION OF USER POSITION, MOVEMENT, AND GAZE IN MIXED REALITY SPACE

(71) Applicant: Microsoft Technology Licensing, LLC, Redmond, WA (US)

(72) Inventors: Anthony Ernst, Bellevue, WA (US); George O. Johnston, Redmond, WA (US); Valeriy Trofimov, Bellevue, WA (US); Gregory Smith, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/839,919

(22) Filed: Apr. 3, 2020

(65) Prior Publication Data

US 2020/0294318 A1 Sep. 17, 2020

Related U.S. Application Data

(63) Continuation of application No. 16/100,167, filed on Aug. 9, 2018, now Pat. No. 10,650,603.

(Continued)

(51) Int. Cl.
*G06T 19/00* (2011.01)
*G06K 9/00* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
None
See application file for complete search history.

(56) References Cited

U.S. PATENT DOCUMENTS

| 2002/0099552 A1* | 7/2002 | Rubin | G09F 27/00 704/270 |
| 2015/0039621 A1* | 2/2015 | Mikolajczyk | G06F 16/58 707/740 |

(Continued)

*Primary Examiner* — Frank S Chen

(57) ABSTRACT

Controlling a mixed reality (MR), virtual reality (VR), or augmented reality (AR) (collectively, MR) environment visualization may involve obtaining a plurality of sensor data from a plurality of data sources; processing the obtained plurality of sensor data using a plurality of data analyzers to identify at least one feature; generating a plurality of annotated data sets, wherein the annotated data sets contain an annotation of the at least one feature; aggregating the plurality of annotated data sets to correlate the at least one feature as a common feature across different annotated data sets of the plurality of annotated data sets; and based at least on the common feature, providing a visualization output representing the MR (VR, AR, or specifically mixed-reality) environment. Disclosed examples enable utilizing of disparate data types from different data sources, localizing the different data a common space, and aggregating results for visualization and/or further analysis.

20 Claims, 8 Drawing Sheets

Related U.S. Application Data

(60) Provisional application No. 62/666,689, filed on May 3, 2018.

(51) Int. Cl.
    *G06F 3/01*      (2006.01)
    *G02B 27/01*     (2006.01)

(52) U.S. Cl.
    CPC ......... *G06F 3/017* (2013.01); *G06K 9/00671* (2013.01); *G02B 2027/0138* (2013.01)

(56) References Cited

U.S. PATENT DOCUMENTS

| | | | |
|---|---|---|---|
| 2016/0161274 A1* | 6/2016 | Mach | G01C 21/3476 |
| | | | 701/426 |
| 2016/0242744 A1* | 8/2016 | Mihailescu | A61B 90/361 |
| 2017/0046108 A1* | 2/2017 | Kang | G06F 3/0346 |
| 2018/0144615 A1* | 5/2018 | Kinney | G08B 13/19695 |
| 2019/0171905 A1* | 6/2019 | Ye | G06K 9/6211 |

* cited by examiner

REPRESENTATION OF USER POSITION, MOVEMENT, AND GAZE IN MIXED REALITY SPACE

CROSS-REFERENCE TO RELATED APPLICATION

This application is a continuation application of and claims priority to U.S. patent application Ser. No. 16/100,167, entitled "REPRESENTATION OF USER POSITION, MOVEMENT, AND GAZE IN MIXED REALITY SPACE," filed on Aug. 9, 2018, which claims priority to U.S. Priority Patent Application No. 62/666,689, entitled "REPRESENTATION OF USER POSITION, MOVEMENT, AND GAZE IN MIXED REALITY SPACE," filed on May 3, 2018, the disclosures of which are incorporated herein by reference in their entireties.

BACKGROUND

Representing activity, such as user position, movement, and gaze in a mixed reality (MR) space presents multiple challenges, and may be difficult to understand in a two-dimensional (2D) representation. This difficulty increases when multiple users' data needs to be viewed simultaneously, or the data needs to be viewed in real-time or scrubbed backwards and forwards. Some insights regarding an MR space and individuals' behaviors may be difficult to appreciate when viewing data in 2D and statically. Current data visualization solutions typically require the data to be sent to a separate location for processing, and then viewed through a webpage or a static application. Such solutions do not permit visualization of the data from the perspective of the user providing the data, or interaction with the data at scale and in real-time.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Controlling a mixed reality (MR), virtual reality (VR), or augmented reality (AR) (collectively, MR) environment visualization may involve obtaining a plurality of sensor data from a plurality of data sources; processing the obtained plurality of sensor data using a plurality of data analyzers to identify at least one feature; generating a plurality of annotated data sets, wherein the annotated data sets contain an annotation of the at least one feature; aggregating the plurality of annotated data sets to correlate the at least one feature as a common feature across different annotated data sets of the plurality of annotated data sets; and based at least on the common feature, providing a visualization output representing the MR (VR, AR, or specifically mixed-reality) environment. Disclosed examples enable utilizing disparate data types from different data sources, localizing the different data a common space, and aggregating results for visualization and/or further analysis.

An exemplary solution for controlling an MR environment visualization may comprise: a processor; and a computer-readable medium storing instructions that are operative when executed by the processor to: obtain a plurality of sensor data from a plurality of data sources; process the obtained plurality of sensor data using a plurality of data analyzers to identify at least one feature; generate a plurality of annotated data sets, wherein the annotated data sets contain an annotation of the at least one feature; aggregate the plurality of annotated data sets to correlate the at least one feature as a common feature across different annotated data sets of the plurality of annotated data sets; and based at least on the common feature, provide a visualization output representing the MR environment.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various embodiments will be described in detail with reference to the accompanying drawings. The same reference numbers may be used throughout the drawings to refer to the same or like parts. References made throughout this disclosure relating to specific examples and implementations are provided solely for illustrative purposes but, unless indicated to the contrary, are not meant to limit all examples.

Controlling a mixed reality (MR), virtual reality (VR), or augmented reality (AR) (collectively, MR) environment visualization may involve obtaining a plurality of sensor data from a plurality of data sources; processing the obtained plurality of sensor data using a plurality of data analyzers to identify at least one feature; generating a plurality of annotated data sets, wherein the annotated data sets contain an annotation of the at least one feature; aggregating the plurality of annotated data sets to correlate the at least one feature as a common feature across different annotated data sets of the plurality of annotated data sets; and based at least on the common feature, providing a visualization output representing the MR (VR, AR, or specifically mixed-reality) environment. Disclosed examples enable utilizing disparate data types from different data sources, localizing the different data a common space, and aggregating results for visualization and/or further analysis.

Figure 1:
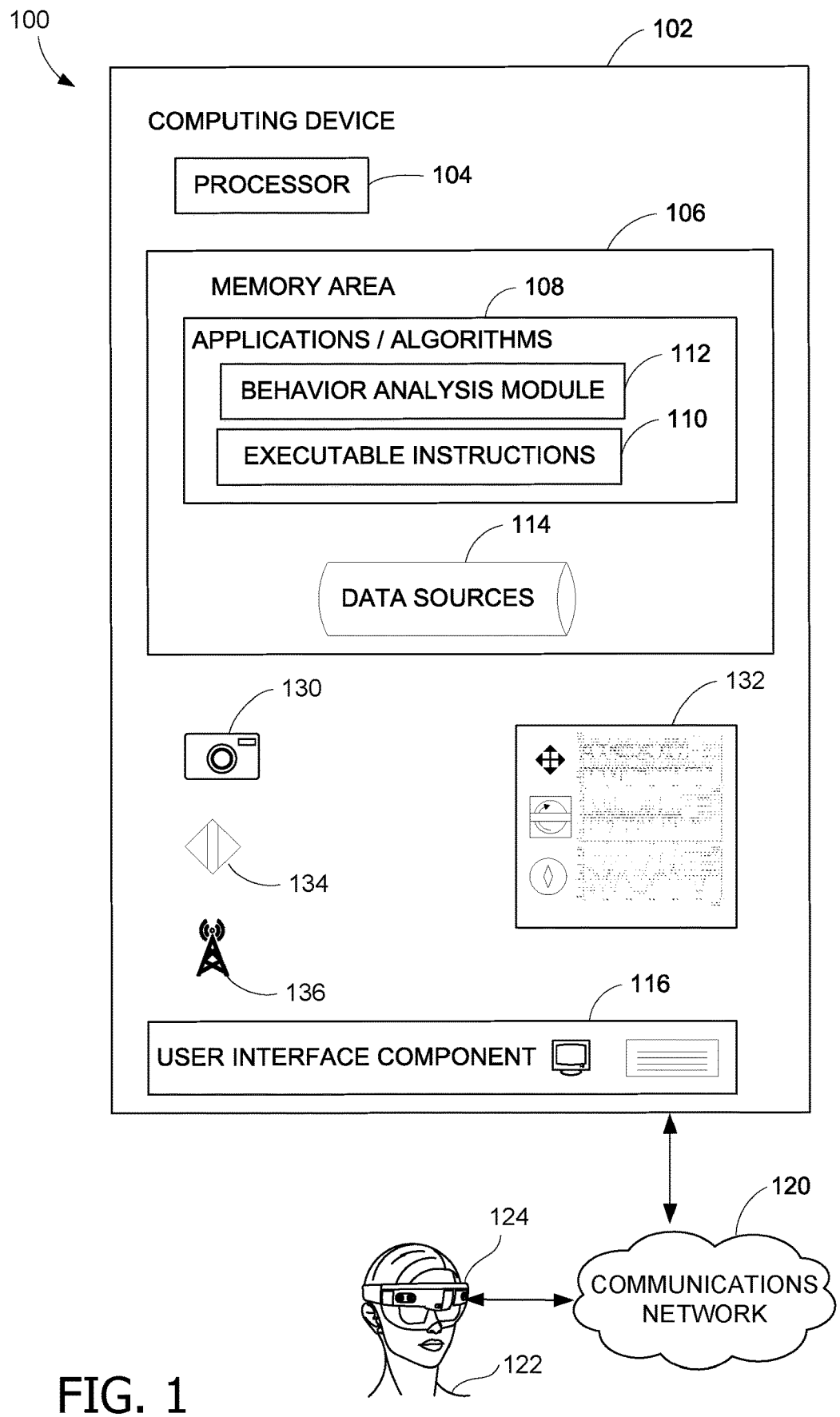
FIG. 1 is a block diagram of an example computing environment that may be implemented as a real-world device or virtual device using some of the various examples disclosed herein.

FIG. 1 is a block diagram of an example computing environment 100 that may be implemented as a real-world device or virtual device using some of the various examples disclosed herein. A computing device 102 represents any device executing instructions (e.g., as application programs, operating system functionality, or both) to implement operations and functionality as described herein. Computing device 102 may include a mobile computing device or any other portable device. In some examples, a mobile computing device includes a mobile telephone, laptop, tablet, computing pad, netbook, gaming device, wearable device, head mounted display (HMD) and/or portable media player. Computing device 102 may also represent less portable devices such as desktop personal computers, kiosks, tabletop devices, industrial control devices, wireless charging stations, electric automobile charging stations, and other physical objects embedded with computing resources and/or network connectivity capabilities. Additionally, computing device 102 may represent a group of processing units or other computing devices.

In some examples, computing device 102 has at least one processor 104, a memory area 106, and at least one user interface. These may be the same or similar to processor(s) 714 and memory 712 of FIG. 7, respectively. Processor 104 includes any quantity of processing units and is programmed to execute computer-executable instructions for implementing aspects of the disclosure. The instructions may be performed by the processor or by multiple processors within the computing device, or performed by a processor external to the computing device. In some examples, processor 104 is programmed to execute instructions such as those that may be illustrated in the other figures.

Computing device 102 further has one or more computer readable media such as the memory area 106. Memory area 106 includes any quantity of media associated with or accessible by the computing device. Memory area 106 may be internal to computing device 102 (as shown in FIG. 1), external to the computing device (not shown), or both (not shown). In some examples, memory area 106 includes read-only memory and/or memory wired into an analog computing device. Memory area 106 stores, among other data, one or more applications or algorithms 108 that include data and executable instructions 110. The applications, when executed by processor 104, operate to perform functionality on the computing device. Exemplary applications include behavior analysis applications and/or behavior visualization applications, such as behavior analysis module 112, for example. The applications may communicate with counterpart applications or services such as web services accessible via a network, such as communications network 120. For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. Memory area 106 may store data sources 114, which may represent data stored locally at memory area 106, data access points stored locally at memory area 106 and associated with data stored remote from computing device 102, or any combination of local and remote data.

The user interface component 116, may include instructions executed by processor 104 of computing device 102, and cause processor 104 to perform operations, including to receive user input, provide output to a user and/or user device, and interpret user interactions with a computing device. Portions of user interface component 116 may thus reside within memory area 106. In some examples, user interface component 116 includes a graphics card for displaying data to a user 122 and receiving data from user 122. User interface component 116 may also include computer-executable instructions (e.g., a driver) for operating the graphics card. Further, user interface component 116 may include a display (e.g., a touch screen display or natural user interface) and/or computer-executable instructions (e.g., a driver) for operating the display. In some examples, the display may be a 3D display, such as may be found in an HMD. User interface component 116 may also include one or more of the following to provide data to the user or receive data from the user: a keyboard (physical or touch-screen display), speakers, a sound card, a camera, a microphone, a vibration motor, one or more accelerometers, a Bluetooth® brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface. In still other examples, a user, such as user 122, may interact with a separate user device 124, which may control or be controlled by computing device 102 over communications network 120, a wireless connection, or a wired connection. In some examples, user device 124 may be similar to functionally equivalent to computing device 102.

As illustrated, in some examples, computing device 102 further includes a camera 130, which may represent a single camera, a stereo camera set, a set of differently-facing cameras, or another configuration. Computing device 102 may also further include an inertial measurement unit (IMU) 132 that may incorporate one or more of an accelerometer, a gyroscope, and/or a magnetometer. The accelerometer gyroscope, and/or a magnetometer may each output measurements in 3D. The combination of 3D position and 3D rotation may be referred to as six degrees-of-freedom (6DoF), and a combination of 3D accelerometer and 3D gyroscope data may permit 6DoF measurements. In general, linear accelerometer data may be the most accurate of the data from a typical IMU, whereas magnetometer data may be the least accurate.

Also illustrated, in some examples, computing device 102 additionally may include a generic sensor 134 and a radio system 136. Generic sensor 134 may include an infrared (IR) sensor (non-visible light sensor), a visible light sensor (such as an ambient light sensor or a spectrally-differentiated set of ambient light sensors), a light detection and ranging (LIDAR) sensor (range sensor), an RGB-D sensor (light and range sensor), an ultrasonic sensor, or any other sensor, including sensors associated with position-finding and range-finding. Radio system 136 may include Bluetooth®, Wi-Fi, cellular, or any other radio or wireless system. Radio system 136 may act as a sensor by detecting signal strength, direction-of-arrival and location-related identification data in received signals, such as GPS signals. Together, one or more of camera 130, IMU 132, generic sensor 134, and radio system 136 may collect data (either real-time, telemetry, or historical data) for use in behavior analysis of user position, movement, and gaze in mixed reality space.

Figure 2:
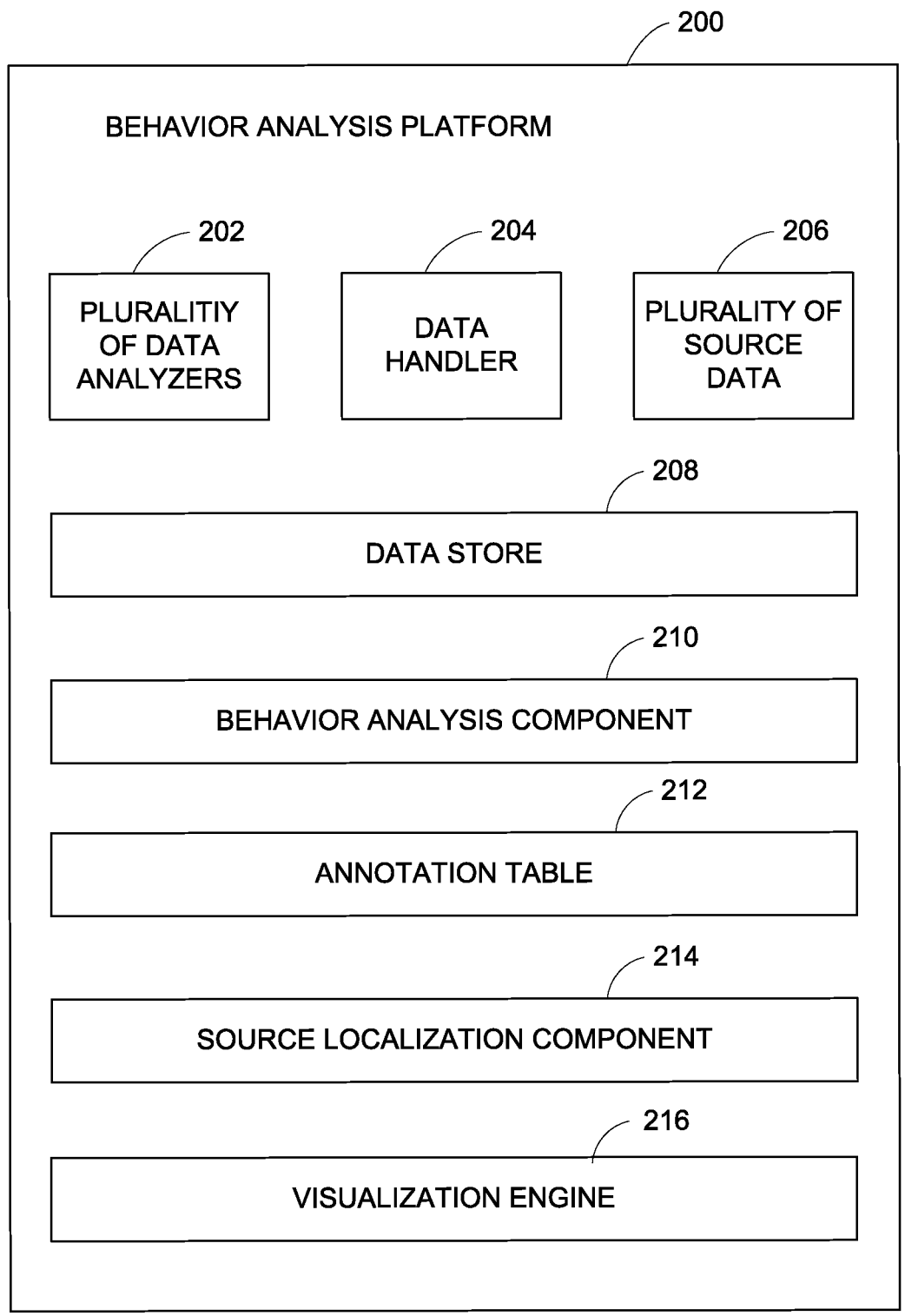
FIG. 2 is a block diagram of a behavior analysis platform suitable for controlling a mixed reality (MR) environment visualization and implementing some of the various examples disclosed herein.

FIG. 2 is a block diagram of a behavior analysis platform 200 that is suitable for controlling an MR environment visualization and implementing some of the various examples disclosed herein. Behavior analysis platform 200

(BA platform 200) may be implemented as a cloud service (see, for example, FIG. 8), in part or in whole, and may further be implemented on one or more computer storage devices having computer-executable instructions stored thereon for improving computer vision through simulated hardware optimization. That is, BA platform 200 may leverage computing environments described in relation to other figures described herein, for example FIG. 7. It should be understood that functionality may be allocated among the different portions in some embodiments differently than is described in this exemplary embodiment.

BA platform 200 includes a plurality of data analyzers 202, a data handler 204, a plurality of sensor data 206 from a plurality of sources, a data store 208, a behavior analysis component 210, an annotation table 212, a source localization component 214, and a visualization engine 216. BA platform 200 obtains and/or receives a plurality of sensor data 206 from one or more data sources. In some examples, a data source may be a data storage device, which stores a number of disparate data sets from a number of disparate data capture devices (e.g., cameras, microphones, keypads, accelerometers, binary sensors, etc.). In other examples, a data source may refer to the data capture device itself, such as the camera that captured image data for example. Source data may be obtained by BA platform 200 directly from the device that captured the data, from a data service that stores data captured from the device, or from a data storage device that stores captured data. Plurality of sensor data 206 may include any number of different types of data sets, such as, without limitation, image data, audio data, thermal data, inertial measurement data, device interaction data, object interaction data, pose data, and any other suitable type of data. Data capture devices may include, without limitation, external monitors (optionally touch capable), VR Headsets and/or attached game controllers, HMD devices, wearable devices, AR-capable devices, mobile devices, wearable devices, cameras, microphones, electronic devices, fitness devices, accelerometers, gyroscopes, magnetometer, IMU, or any other suitable sensor. Data capture devices may also include fixed devices, such as a keypad on a wall or a door with a state sensor, as well as any other device that is configured to know its own location or determine its own location and captures device interaction data.

Data handler 204 identifies a data type for each of the data sets in plurality of sensor data 206 and routes each data set to a corresponding or complimentary data analyzer of plurality of data analyzers 202, based on the identified data type and the known data protocol of each data analyzer. In some examples, data handler 204 may be an optional component, and BA platform 200 may be implemented without data handler 204. In such examples, each data analyzer in the plurality of data analyzers 202 may ingest data type(s) according to its capabilities. Plurality of data analyzers 202 may initially parse plurality of sensor data 206 so that individual data analyzers may reject or accept an individual data set for processing based on the data type of the individual data set.

Plurality of data analyzers 202 includes different types of data analyzers that provide different insight generations into processed data sets, such as plurality of sensor data 206. Each data analyzer may use a differently-tailored or capable machine learning (ML) model and/or algorithm configured to process different data types. One or more data sets of a particular data type may be processed by one or more different data analyzers in these examples, depending upon the compatible data types for the various data analyzers, such that a particular data set may be ingested by more than just a single data analyzer.

The data sets may be processed by the data analyzers in parallel, or parts of data sets (subsets of data) may be run through different analyzers in some examples. Some of the data analyzers may use the output of another data analyzer to further analyze the data set and provide advanced insight. For example, analyzing the location of persons or objects that are moving within a spatial volume may include both an analysis of persons and objects that are within that spatial volume and also an analysis of which ones are moving, versus which ones are stationary. In this example, image data may be processed by a first data analyzer to identify persons and objects moving within the space as opposed to persons or objects that are stationary within the space. A second data analyzer may ingest the output of the first analyzer and further analyze the image data to determine where within the space the identified movers (e.g., persons, objects) are located. In some examples, more information regarding movement may be analyzed, such as displacement, directions and speed. A third data analyzer may also ingest the output of the first analyzer and further analyze the image data to determine one or more poses of the identified movement (e.g., waving, reaching, stretching), and other movement.

Data analyzes of plurality of data analyzers 202 generate one or more labels for annotating one or more data points of an analyzed data set. For example, the output of a data analyzer may include one or more identified features with a space/time association, such as "door opened (feature) at office (space) at 5:00 PM (time)." The data analysis result of a data analyzer for a data set is an annotated data set, in which one or more data points of the annotated data set is labeled with a feature and space/time association. Each data point then has a reference that links to an analysis storage set and reference table, such as annotation table 212.

Plurality of data analyzers 202 provide annotated data set results as the output of processing plurality of sensor data 206. The annotated data sets from plurality of data analyzers 202 are stored in data store 208 of BA platform 200. Behavior analysis component 210 obtains the annotated data sets from data store 208 and may aggregate multiple feature and space/time associations into a holistic picture of what occurred in a particular space during a period of time to provide a behavior analysis result. The behavior analysis result may be leveraged for further analysis (e.g., to identify overlaps, trends, etc.). Behavior analysis component 210 may also filter stored annotated data sets by individual annotations to isolate desired features. For example, behavior analysis component 210 may filter to search the annotated data sets for a feature of "walking" or "sitting."

In some examples, behavior analysis results may identify a head position of a user in a space, or provide behavior mapping to identify relatively more complex tasks, such as skipping, jumping, and others, based on data analysis results from data analyzers processing obtained data sets from data sources such as an accelerometer and/or IMU 132 (of FIG. 1). As another example, behavior analysis results may include user interaction analysis derived from device interaction data and object interaction data within a space, such as interaction with camera data, HMD data, or a hand tracker. A device that tracks user movement may also track user interaction with virtual reality objects. Devices that track user movement, such as a pedometer or wearable fitness device, provide data that can be analyzed to discern hand movement, and in turn leveraged to understand how a user interacted with a virtual object, for example.

Source localization component 214 identifies one or more common anchors from two or more data sets obtained from disparate data sources and uses the identified common anchors to fuse the disparate data sets to a common space. For example, using voice data captured by a microphone and image data separately captured by a camera remote from the microphone, source localization component 214 identifies a common anchor based on determining that someone is talking because a mouth is moving in the image data at the same time that speech is detected in an audio file, based on timestamps associated with each of the image file and the audio file. The data source that provided the image data and the data source that provided the audio file (both in data sources 206) can then be fused as belonging to a common space or feature and space/time association.

As an example, a wearable fitness device may already have data on a user's identity and location, while an image capture device configured with facial recognition features separately identifies the user. Based on timestamp data the wearable device and the image capture device may be localized to a common space or event using the common anchors of the user identity and timestamp data. In another example, such as a scenario involving a warehouse entry event, a user may not have a sensing device on their person. However, as the user approaches a door the user may interact with a wall-mounted keypad to open or unlock the door. The door sensor data and/or the keypad data may indicate that the door opened at a given point in time, although the data does not indicate the user who opened the door. A separate data source, such as a camera aimed at the opposite (interior) side of doorway, may captures one or more images of the door opening. This camera event data may then be correlated, using timestamps, with the door sensor and keypad data, to associate an image of a person opening the door with the door opening feature. Source localization component 214 may perform the correlation of the time of the keypad/door open data and timestamp of the image data, to identify a common anchor of the door opening at the same time in both the door/keypad data and the image data. Facial recognition may then be performed on image data, identify a face of the user, localize a data object of the user identity with the data of the image capture and the data of the keypad/door opening, and then annotations may be used on the disparate data sets. Behavior analysis component 210 is then able to identify the activity of the identified user did in the common space, because that person/user would be a feature stored in the annotation data store. In this way, the common anchors identified by source localization component 214 are aggregated for use by behavior analysis component 210. Results may be written to data store 208. This further enables visualization engine 216 to understand behavior that occurred in a space in order to present a 3D visualization of the behaviors in a MR space where the data capture originally occurred.

Visualization engine 216 may obtain data from data store 208 or receive a live feed of data from behavior analysis component 210 and/or source localization component 214 in real-time. Visualization engine 216 may provide a recreation or representation of user behavior in an MR space. In some examples, annotated data sets obtained from data store 208 enable visualization engine 216 to perform operations such as user pose rehydration, generating a virtual representation of the user in the space performing the actions detected and identified, localized to the space and in the time sequence in which the actions occurred. In other examples may include user group detection, identifying joint experiences in space, detecting relationships between people based on how they move within a space relative to one another, and other joint features. The annotation data may be stored in data store 208 for further analysis or used in real-time by behavior analysis platform 200 for live analysis of dynamic change in a space or environment.

The examples provided herein enable utilization of disparate data types from different data sources, localizing the different data sources to a common space, unifying the data for the common space, and providing the ability to obtain the disparate analysis results in aggregate form for visualization and/or further analysis. Data collection may occur continually, regardless of whether behavior analysis platform 200 is operating. Behavior analysis platform 200 may use historic data or live data, or any data stored or captured by devices. Behavior analysis platform 200 may further provide tools for manipulation of the data, both the aggregated data and the individual data sets. By annotating data points, and fusing data sources based on identified common anchors, aspects of this disclosure enable filtering of the stored data sets by features, time, and/or space, as well as data scrubbing (speeding up, slowing down, rewind, fast forward, repeat scene) during data visualization.

Figure 3:
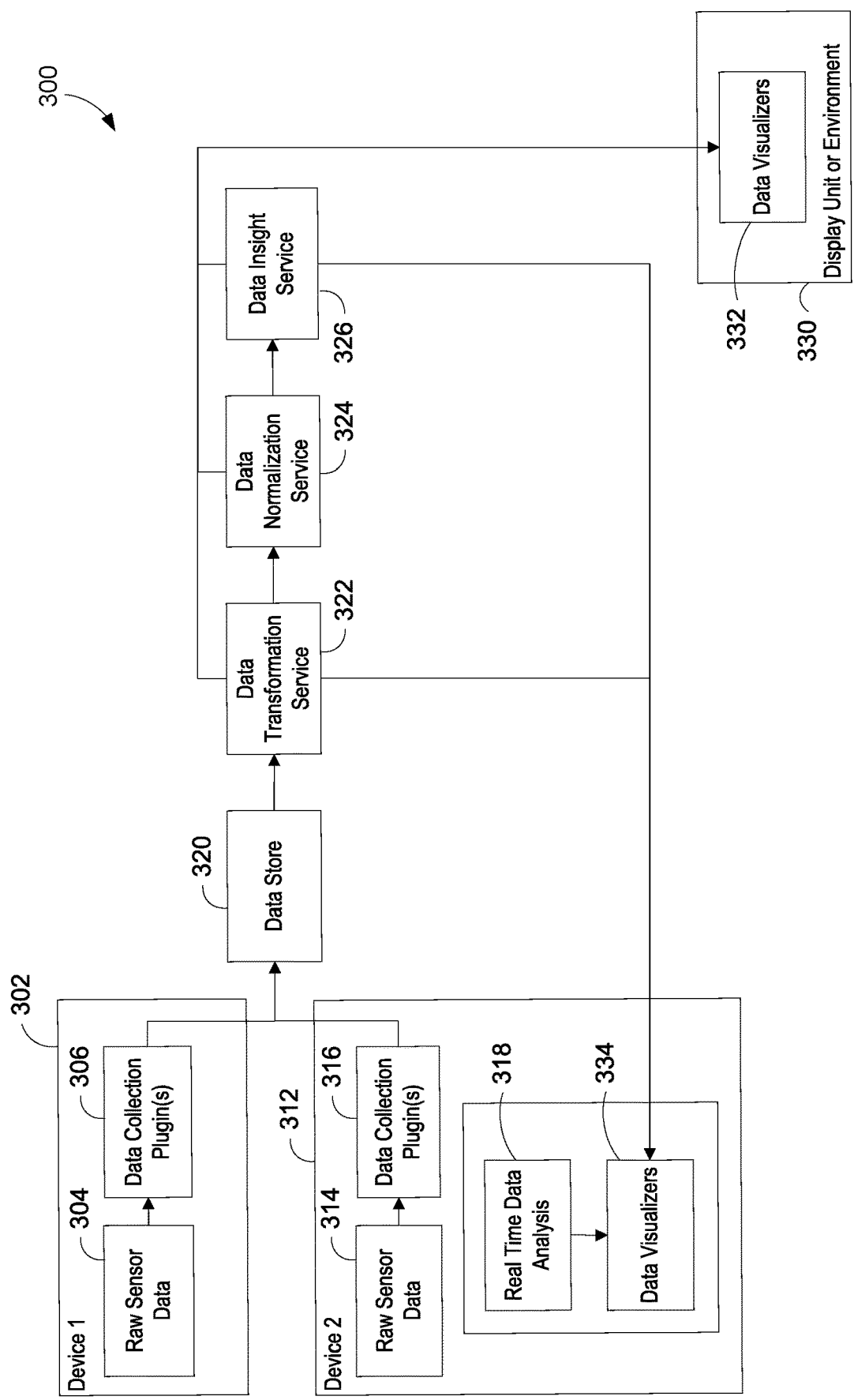
FIG. 3 is a block diagram of a behavior analysis platform system diagram for controlling an MR environment visualization and implementing some of the various examples disclosed herein.

FIG. 3 is a block diagram of a behavior analysis platform system diagram 300 for controlling an MR environment visualization and implementing some of the various examples disclosed herein. Raw sensor data 304 may be obtained by data collection plugin(s) 306 at a first device 302. Similarly raw sensor data 314 may be obtained by data collection plugin(s) 316 at a second device 312. The data may then be transmitted to a data store 320, which may be similar to data store 208 (of FIG. 2). In some examples, a data transformation service 322 obtains the raw data stored at data store 320 and transforms the raw data into actionable constructs. In some examples, data transformation service 322 may be similar in operation to plurality of data analyzers 202 (of FIG. 2). A data normalization service 324 obtains the output from data transformation service 322 (the actionable constructs) and localizes the data sets from different devices into a common space or common event(s). In some examples, data normalization service 324 may be similar in operation to source localization component 214 (of FIG. 2).

A data insight service 326 obtains the output of data normalization service 324 and uses the output to provide users with machine learning (ML) insights and/or artificial intelligence (AI) based insights. In some examples, data insight service 326 may be similar in operation to behavior analysis component 210 (of FIG. 2). The data insight generation output from data insight service 326 may be passed to one or more data visualizers 332 and 334, where the output may be displayed in a 2D or 3D representation on a display unit 330 or a display environment, via an application or over the internet. In some examples, this may be similar to the operation of visualization engine 216 (of FIG. 2).

In other examples, one or more of the data visualizers that obtain the data insight generation output may be implemented on a device that obtained at least part of the raw sensor data, such as data visualizer 334 on second device 312, for output via a device display. In yet other examples, the data collection plugin(s) 316 of second device 312 may pass the raw sensor data to a real-time data analysis module 318 of the device, where the real-time data analysis module performs the data transformation, data normalization, and data insight generation (similar to the functions described for data transformation service 322, data normalization service 324, and data insight service 326) to provide the data insight generation output to data visualizer 334 of second device 312 in real-time for real-time analysis and visualization.

Figure 4:
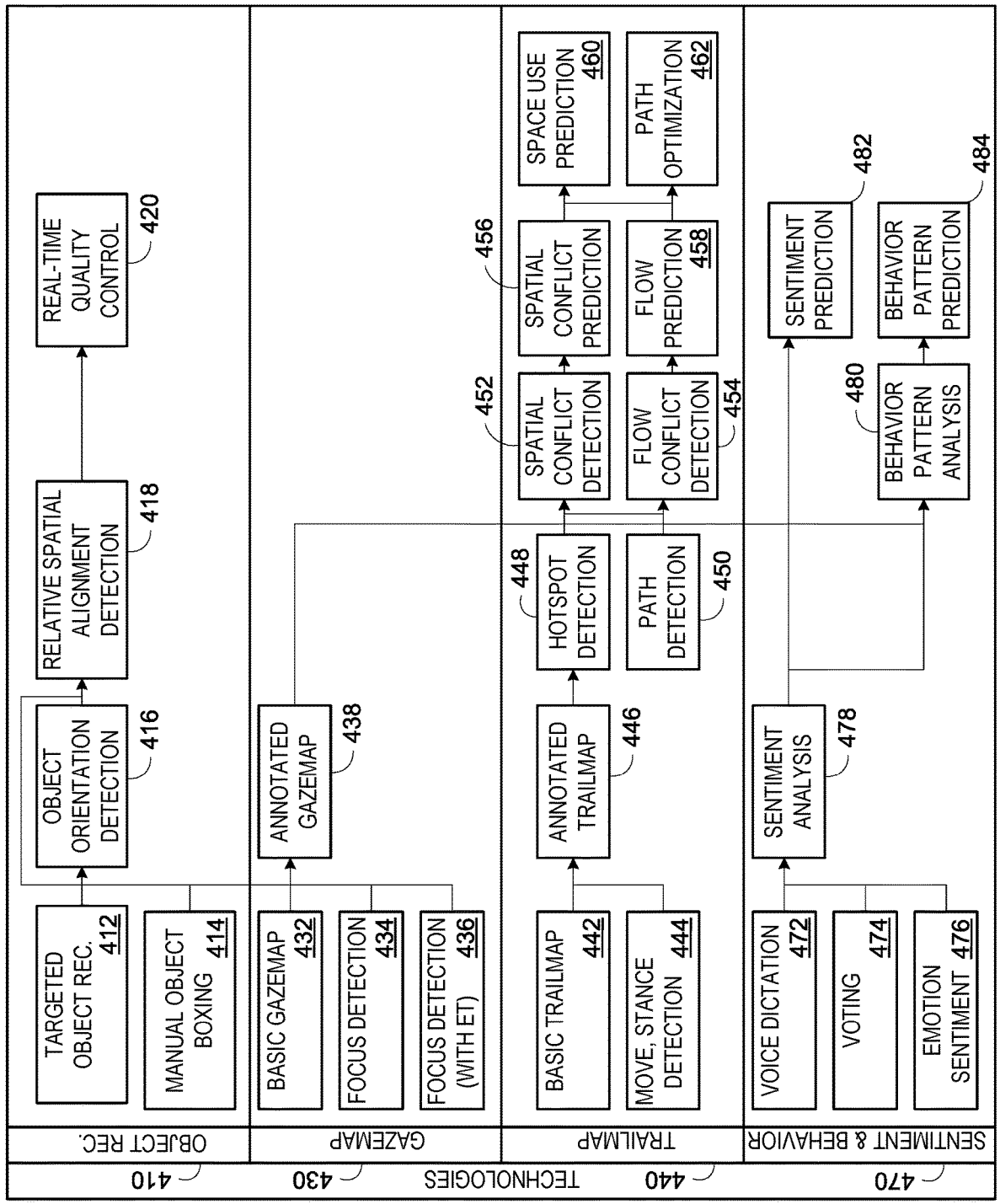
FIG. 4 is a flowchart of various data types that may be processed by the various examples disclosed herein.

FIG. 4 is a flowchart 400 of various data types that may be processed by the various examples disclosed herein. As depicted in FIG. 4, sentiment and behavior identification 470, trail map reconstruction and/or optimization 440, gaze map reconstruction 430, and object reconstruction 410 are included in differing types of technologies or processes that may leverage a behavior analysis platform. In object reconstruction 410, a targeted object reconstruction process 412 and a manual object boxing process 414 feed data into an object orientation detection process 416, which then deeds data into a relative spatial alignment detection process 418. Relative spatial alignment detection process 418 then outputs data to a real-time quality control operation or process 420.

In gaze map reconstruction 430, a basic gazemap process 432 provides data for an annotated gazemap 438 (which may be one of the annotated data sets described in relation to FIGS. 2, 3, 5 and 6). Focus detection processes 434 and 436 feed into annotated gazemap 438 as another source of information for the annotations (such as "user was focusing on this object at this time"). Annotated gazemap 438 is then available for ingestion by a behavioral pattern analysis 480. Focus detection processes 436 uses eye tracking (ET) which is a separate source of information from the pointing direction of a head. In general, ET is more demanding on sensors and processing than detection of head-pointing direction. Additionally, focus detection processes 434 and 436 may also feed into a relative spatial alignment detection process 418.

In trail map reconstruction and/or optimization 440, a basic trailmap 442 and movement/stance detection process 444 are used in the generation of an annotated trailmap 446 (which may be another one of the annotated data sets described in relation to FIGS. 2, 3, 5 and 6). Annotated trailmap 446 may be used for hotspot detection 448. Hotspot detection 448, along with path detection 450 provide input to spatial conflict detection 452 and flow conflict detection 454. Spatial conflict detection 452 output may be used for spatial conflict prediction 456, whereas flow conflict detection 454 output may be used for flow prediction 458. Spatial conflict prediction 456 and flow prediction 458 may then both be used for space use prediction 460 and path optimization 462.

In sentiment and behavior identification 470, a voice dictation process 472 and voting process 474, along with emotion and sentiment detection 476 may be used by sentiment analysis 478. In some embodiments, sentiment analysis 478 may be an example of one of the plurality of data analyzers 202 (of FIG. 2). Sentiment analysis 478 provides input for sentiment prediction 482 and also behavior pattern analysis 480, along with annotated gazemap 438. Behavior pattern analysis 480 provides input for behavior pattern prediction 484.

Figure 5:
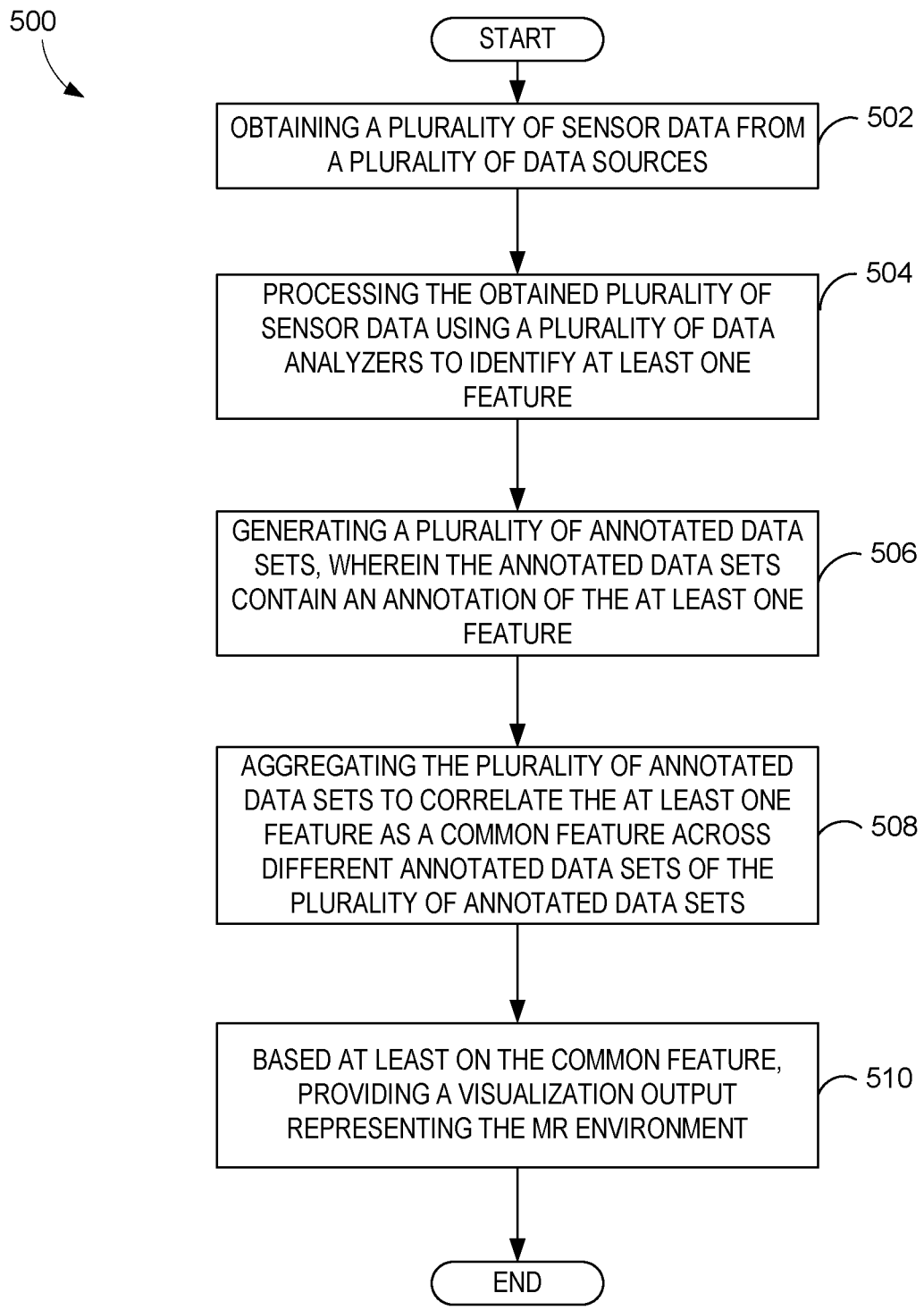
FIG. 5 is a flowchart diagram of a work flow for controlling an MR environment visualization.

FIG. 5 is a flowchart diagram 500 of a work flow for controlling an MR environment visualization, also including VR and AR environment visualizations. Operation 502 includes obtaining a plurality of sensor data from a plurality of data sources. Operation 504 includes processing the obtained plurality of sensor data using a plurality of data analyzers to identify at least one feature. Operation 506 includes generating a plurality of annotated data sets, wherein the annotated data sets contain an annotation of the at least one feature. Operation 508 includes aggregating the plurality of annotated data sets to correlate the at least one feature as a common feature across different annotated data sets of the plurality of annotated data sets. Operation 510 includes, based at least on the common feature, providing a visualization output representing the MR environment.

Figure 6:
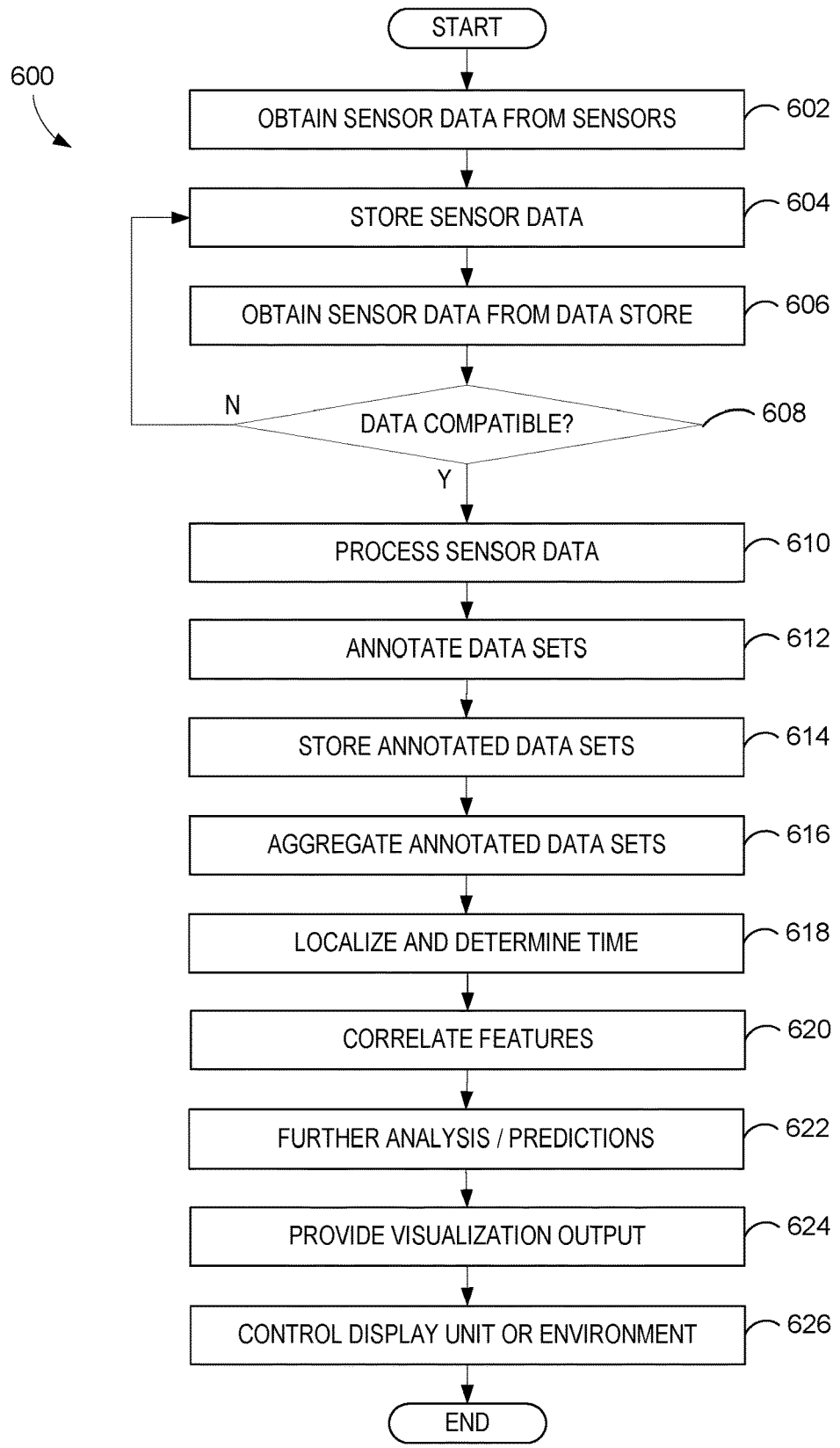
FIG. 6 is another flowchart diagram of a work flow for a controlling an MR environment visualization.

FIG. 6 is another flowchart diagram 600 of a work flow for a controlling an MR environment visualization, also including VR and AR environment visualizations. FIG. 6 should be viewed along with FIG. 3. Operation 602 includes obtaining a plurality of sensor data from a plurality of data sources, for example raw sensor data 304 and 314, which is stored in data store 320. In some examples, the plurality of sensor data from a plurality of data sources comprises source data from each of a plurality of different sensors. In some examples, the plurality of different sensors may include at least two sensors selected from the list consisting of: a first camera, a second camera aimed to provide stereo vision with the first camera, a third camera oriented differently than the first camera, a microphone, an accelerometer, a GPS sensor, a photoreceptive light sensor, a keypad, a wearable device, and an IMU. In some examples, the plurality of sensor data from a plurality of data sources may include at least two selected from the list consisting of: user position data, user motion data, user gaze data, user-object interaction data, and object manipulation data.

Operation 604 includes storing sensor data, for example in data store 320. Operation 606 includes obtaining a plurality of sensor data from a plurality of data sources, for example data transformation service 322 obtaining sensor data from data store 320. Decision operation 608 determines whether the obtained data is useable with a particular data analyzer, and if not, foes on to the next data analyzer or set of sensor data. When compatible data is ingested, operation 610 includes processing the obtained plurality of sensor data using a plurality of data analyzers to identify at least one feature. In some examples, with some data sets, multiple features may be identified. Data sets are annotated in operation 612. The annotation may identify a feature and a space/time association for the corresponding data point. Thus, operation 612 includes generating a plurality of annotated data sets, wherein the annotated data sets contain an annotation of the at least one feature. In some examples, each data point may have a reference that links to an analysis storage set and reference table, such as annotation table 212 (of FIG. 2). The annotated data sets are stored in operation 614, for example in data store 320.

Operations 616 through 620 include aggregating the plurality of annotated data sets to correlate the at least one feature as a common feature across different annotated data sets of the plurality of annotated data sets. For example, data sets are aggregated in operation 616 and data normalization service 324 can perform localization and use timestamp information in operation 618 in order to correlate the at least one feature as a common feature across different annotated data sets. In some examples, data normalization service 324 identifies one or more common anchors from two or more data sets obtained from disparate data sources and uses the identified common anchors to fuse the disparate data sets to a common space. In some examples, correlating the at least one feature as a common feature across different annotated data sets of the plurality of annotated data sets comprises using timestamp information to determine a time of the at least one feature within each of two or more of the annotated data sets. In some examples, correlating the at least one feature as a common feature across different annotated data sets of the plurality of annotated data sets comprises localizing the at least one feature to a common space within each of two or more of the annotated data sets.

Operation 622 includes using the aggregated data for further analysis and predictions, for example, using data insight service 326. As an example, aggregating data on traffic through some region, such as a room or building, may be used to predict future traffic patterns. This may have value in the event that changes are planned, so that future potential traffic patterns may be analyzed for potential problems or improvements. See, for example, FIG. 4, describing behavioral pattern prediction 484 and that spatial conflict prediction 456 and flow prediction 458 may be used for space use prediction 460 and path optimization 462. Operation 624 includes, based at least on the common feature, providing a visualization output representing the MR environment. Operation 626 includes controlling a display unit, based at least on the visualization output, for example controlling display unit 330.

Additional Examples

Some aspects and examples disclosed herein are directed to a solution for controlling an MR environment visualization that may comprise: a processor; and a computer-readable medium storing instructions that are operative when executed by the processor to: obtain a plurality of sensor data from a plurality of data sources; process the obtained plurality of sensor data using a plurality of data analyzers to identify at least one feature; generate a plurality of annotated data sets, wherein the annotated data sets contain an annotation of the at least one feature; aggregate the plurality of annotated data sets to correlate the at least one feature as a common feature across different annotated data sets of the plurality of annotated data sets; and based at least on the common feature, provide a visualization output representing the MR environment.

Additional aspects and examples disclosed herein are directed to a process for controlling an MR environment visualization that may comprise: obtaining a plurality of sensor data from a plurality of data sources; processing the obtained plurality of sensor data using a plurality of data analyzers to identify at least one feature; generating a plurality of annotated data sets, wherein the annotated data sets contain an annotation of the at least one feature; aggregating the plurality of annotated data sets to correlate the at least one feature as a common feature across different annotated data sets of the plurality of annotated data sets; and based at least on the common feature, providing a visualization output representing the MR environment.

Additional aspects and examples disclosed herein are directed to one or more computer storage devices having computer-executable instructions stored thereon for controlling an MR environment visualization, which, on execution by a computer, may cause the computer to perform operations comprising: obtaining a plurality of sensor data from a plurality of data sources; processing the obtained plurality of sensor data using a plurality of data analyzers to identify at least one feature; generating a plurality of annotated data sets, wherein the annotated data sets contain an annotation of the at least one feature; aggregating the plurality of annotated data sets to correlate the at least one feature as a common feature across different annotated data sets of the plurality of annotated data sets; based at least on the common feature, providing a visualization output representing the MR environment; and controlling a display unit, based at least on the visualization output.

Alternatively, or in addition to the other examples described herein, other examples may include, but are not limited to, any combination of the following:

the instructions are further operative to control a display unit, based at least on the visualization output;

the plurality of sensor data from a plurality of data sources comprises source data from each of a plurality of different sensors;

the plurality of sensor data from a plurality of data sources comprises at least two selected from the list consisting of: user position data, user motion data, user gaze data, user-object interaction data, and object manipulation data;

the plurality of different sensors comprises at least two sensors selected from the list consisting of: a first camera, a second camera aimed to provide stereo vision with the first camera, a third camera oriented differently than the first camera, a microphone, an accelerometer, a GPS sensor, a photoreceptive light sensor, a keypad, a wearable device, and an IMU;

correlating the at least one feature as a common feature across different annotated data sets of the plurality of annotated data sets comprises using timestamp information to determine a time of the at least one feature within each of two or more of the annotated data sets; and correlating the at least one feature as a common feature across different annotated data sets of the plurality of annotated data sets comprises localizing the at least one feature to a common space within each of two or more of the annotated data sets.

While the aspects of the disclosure have been described in terms of various examples with their associated operations, a person skilled in the art would appreciate that a combination of operations from any number of different examples is also within scope of the aspects of the disclosure.

Example Operating Environment

Figure 7:
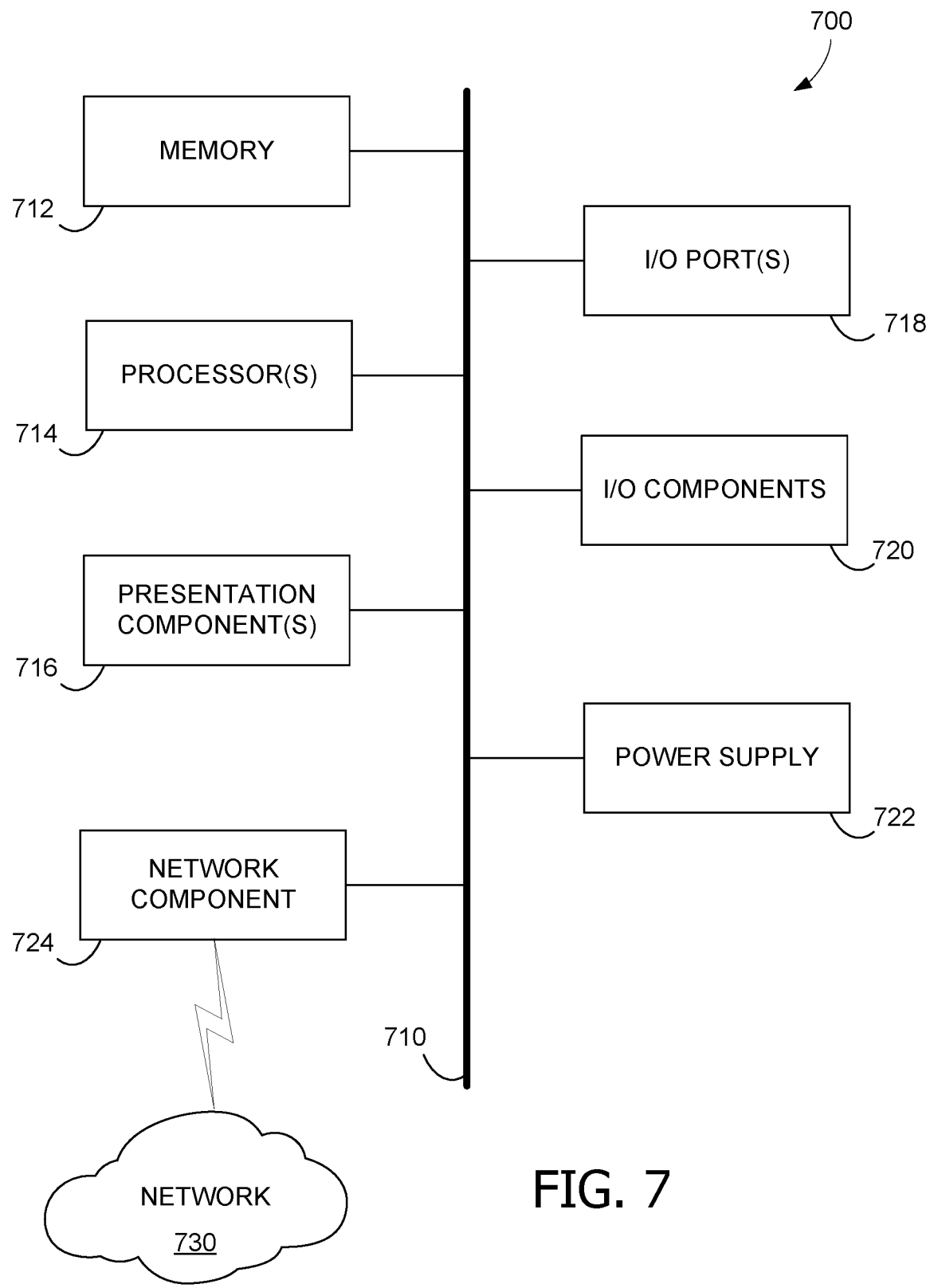
FIG. 7 is a block diagram of an example computing environment suitable for implementing some of the various examples disclosed herein.

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components/modules illustrated.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments, such as those disclosed in FIG. 8 described in more detail below, where tasks are performed by remote-processing devices that are linked through a communications network.

Computing device 700 includes a bus 710 that directly or indirectly couples the following devices: computer-storage memory 712, one or more processors 714, one or more presentation components 716, input/output (I/O) ports 718, I/O components 720, a power supply 722, and a network component 724. Computer device 700 should not be interpreted as having any dependency or requirement related to any single component or combination of components illustrated therein. While computer device 700 is depicted as a seemingly single device, multiple computing devices 700 may work together and share the depicted device resources. For instance, computer-storage memory 712 may be distributed across multiple devices, processor(s) 714 may provide housed on different devices, and so on.

Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and the references herein to a "computing device."

Computer-storage memory 712 may take the form of the computer-storage media references below and operatively provide storage of computer-readable instructions, data structures, program modules and other data for the computing device 700. For example, computer-storage memory 712 may store an operating system, a universal application platform, or other program modules and program data. Computer-storage memory 712 may be used to store and access instructions configured to carry out the various operations disclosed herein.

As mentioned below, computer-storage memory 712 may include computer-storage media in the form of volatile and/or nonvolatile memory, removable or non-removable memory, data disks in virtual environments, or a combination thereof. And computer-storage memory 712 may include any quantity of memory associated with or accessible by the display device 700. The memory 712 may be internal to the display device 700 (as shown in FIG. 7), external to the display device 700 (not shown), or both (not shown). Examples of memory 712 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device 700. Additionally or alternatively, the computer-storage memory 712 may be distributed across multiple display devices 700, e.g., in a virtualized environment in which instruction processing is carried out on multiple devices 700. For the purposes of this disclosure, "computer storage media," "computer-storage memory," "memory," and "memory devices" are synonymous terms for the computer-storage media 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flowcharts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700.

Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways.

Ports 718 allow computing device 700 to be logically coupled to other devices including I/O components 720, some of which may be built in. Examples I/O components 720 include, for example but without limitation, a microphone, joystick, game pad, satellite dish, scanner, printer, wireless device, etc.

The computing device 700 may operate in a networked environment via the network component 724 using logical connections to one or more remote computers over a network 730. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, the network component 724 is operable to communicate data over public, private, or hybrid (public and private) using a transfer protocol, between devices wirelessly using short range communication technologies (e.g., near-field communication (NFC), Bluetooth® branded communications, or the like), or a combination thereof. By way of example, network 730 may include, without limitation, one or more communication networks, such as local area networks (LANs) and/or wide area networks (WANs).

Figure 8:
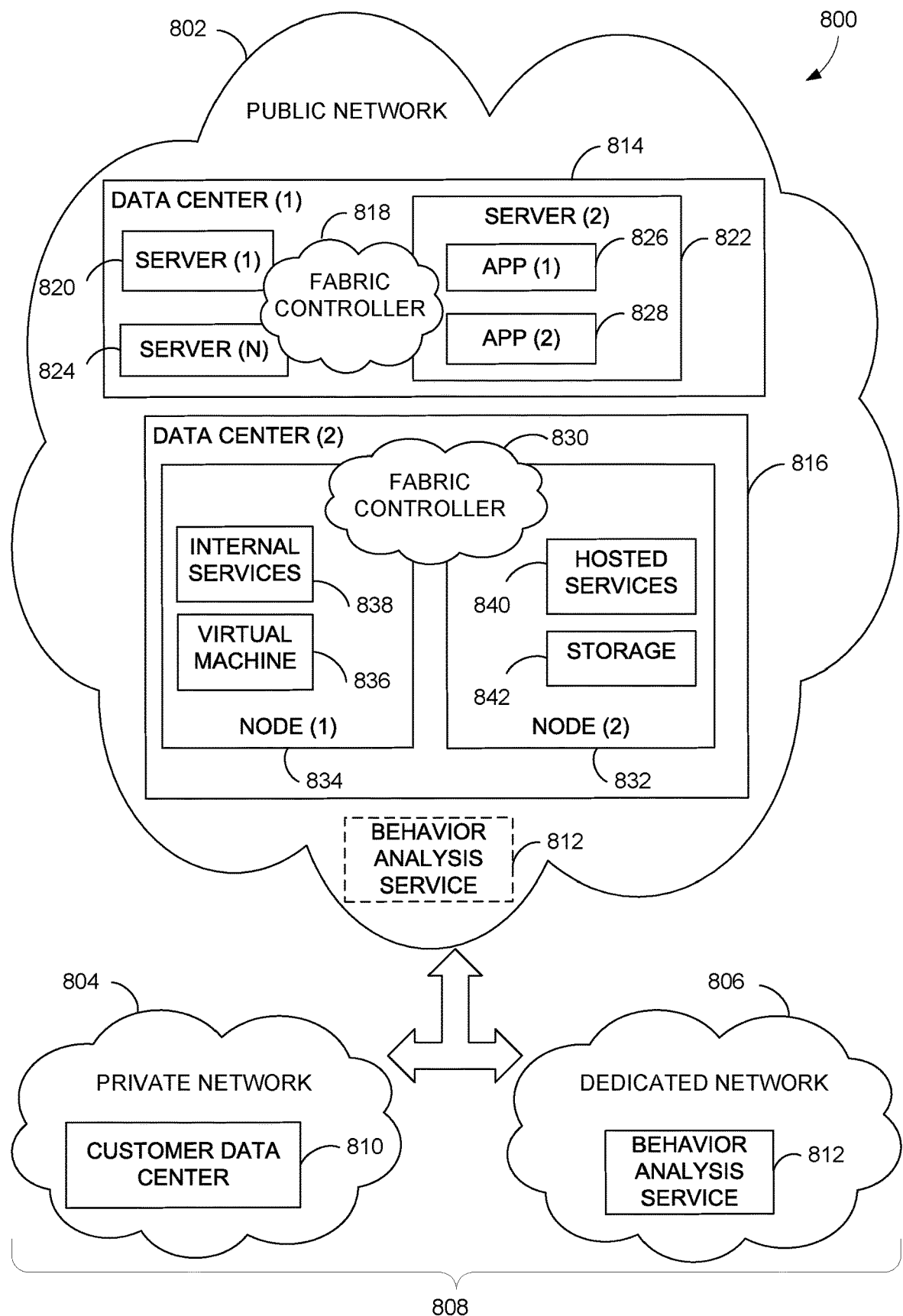
FIG. 8 is a block diagram of an example cloud-computing infrastructure suitable for a behavior analysis service implementing some of the various examples disclosed herein.

Turning now to FIG. 8, an exemplary block diagram illustrates a cloud-computing architecture 800, suitable for use in implementing aspects of this disclosure. Architecture 800 should not be interpreted as having any dependency or requirement related to any single component or combination of components illustrated therein. In addition, any number of nodes, virtual machines, data centers, role instances, or combinations thereof may be employed to achieve the desired functionality within the scope of embodiments of the present disclosure.

The distributed computing environment of FIG. 8 includes a public network 802, a private network 804, and a dedicated network 806. Public network 802 may be a public cloud-based network of computing resources, for example. Private network 804 may be a private enterprise network or private cloud-based network of computing resources. And dedicated network 806 may be a third-party network or dedicated cloud-based network of computing resources. In some examples, private network 804 may host a customer data center 810, and dedicated network 806 may host cloud behavior analysis services 812.

Hybrid cloud 808 may include any combination of public network 802, private network 804, and dedicated network 806. For example, dedicated network 806 may be optional, with hybrid cloud 808 comprised of public network 802 and private network 804. Along these lines, some customers may opt to only host a portion of their customer data center 810 in the public network 802 and/or dedicated network 806, retaining some of the customers' data or hosting of customer services in the private network 804. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 808 in which some data storage and processing is performed in the public network 802 while other data storage and processing is performed in the dedicated network 806.

Public network 802 may include data centers configured to host and support operations, including tasks of a distributed application, according to the fabric controller 818. It will be understood and appreciated that data center 814 and data center 816 shown in FIG. 8 are merely examples of suitable implementations for accommodating one or more distributed applications, and are not intended to suggest any limitation as to the scope of use or functionality of examples disclosed herein. Neither should data center 814 and data center 816 be interpreted as having any dependency or requirement related to any single resource, combination of resources, combination of servers (e.g., servers 820 and 824) combination of nodes (e.g., nodes 832 and 834), or a set of application programming interfaces (APIs) to access the resources, servers, and/or nodes.

Data center 814 illustrates a data center comprising a plurality of servers, such as servers 820 and 824. A fabric controller 818 is responsible for automatically managing the servers 820 and 824 and distributing tasks and other resources within the data center 814. By way of example, the fabric controller 818 may rely on a service model (e.g., designed by a customer that owns the distributed application) to provide guidance on how, where, and when to configure server 822 and how, where, and when to place application 826 and application 828 thereon. One or more role instances of a distributed application may be placed on one or more of the servers 820 and 824 of data center 814, where the one or more role instances may represent the portions of software, component programs, or instances of roles that participate in the distributed application. In other examples, one or more of the role instances may represent stored data that are accessible to the distributed application.

Data center 816 illustrates a data center comprising a plurality of nodes, such as node 832 and node 834. One or more virtual machines may run on nodes of data center 816, such as virtual machine 836 of node 834 for example. Although FIG. 8 depicts a single virtual node on a single node of data center 816, any number of virtual nodes may be implemented on any number of nodes of the data center in accordance with illustrative embodiments of the disclosure. Generally, virtual machine 836 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 836 may include processing capacity, storage locations, and other assets within the data center 816 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 830 is responsible for automatically managing the virtual machines running on the nodes of data center 816 and for placing the role instances and other resources (e.g., software components) within the data center 816. By way of example, the fabric controller 830 may rely on a service model (e.g., designed by a customer that owns the service application) to provide guidance on how, where, and when to configure the virtual machines, such as virtual machine 836, and how, where, and when to place the role instances thereon.

As described above, the virtual machines may be dynamically established and configured within one or more nodes of a data center. As illustrated herein, node 832 and node 834 may be any form of computing devices, such as, for example, a personal computer, a desktop computer, a laptop computer, a mobile device, a consumer electronic device, a server, the computing device 700 of FIG. 7, and the like. In one instance, the nodes 832 and 834 host and support the operations of the virtual machine(s) 836, while simultaneously hosting other virtual machines carved out for supporting other tenants of the data center 816, such as internal services 838, hosted services 840, and storage 842. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 802. The network cloud serves to interconnect resources, such as the role instances, which may be distributed across various physical hosts, such as nodes 832 and 834. In addition, the network cloud facilitates communication over channels connecting the role instances of the service applications running in the data center 816. By way of example, the network cloud may include, without limitation, one or more communication networks, such as LANs and/or WANs. Such communication networks are commonplace in offices, enterprise-wide computer networks, intranets, and the internet, and therefore need not be discussed at length herein.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The examples illustrated and described herein, as well as examples not specifically described herein but within the scope of aspects of the disclosure, constitute exemplary means for providing solutions as disclosed herein. The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for providing behavior data for a mixed reality (MR) environment visualization, the system comprising:
 a processor; and
 a computer-readable medium storing instructions that are operative when executed by the processor to:
  obtain a plurality of sensor data from a plurality of data sources;
  process the obtained plurality of sensor data using a plurality of data analyzers to identify at least one feature;
  generate a plurality of annotated data sets, wherein the annotated data sets contain an annotation of the at least one feature;
  aggregate the plurality of annotated data sets to identify the at least one feature as a common feature across different annotated data sets of the plurality of annotated data sets, wherein the common feature is used to provide a visualization output representing the MR environment.

2. The system of claim 1 wherein the aggregated annotated data sets and the common feature are used to predict future patterns.

3. The system of claim 1 wherein the plurality of sensor data from a plurality of data sources comprises source data from each of a plurality of different sensors.

4. The system of claim 1 wherein the plurality of sensor data from a plurality of data sources comprises at least two selected from the list consisting of:
localization data, position data, motion data, gaze data, timestamp data, object interaction data, and object manipulation data.

5. The system of claim 1 wherein the plurality of different sensors comprises at least two sensors selected from the list consisting of:
a first camera, a second camera aimed to provide stereo vision with the first camera, a third camera oriented differently than the first camera, a microphone, an accelerometer, a GPS sensor, a photoreceptive light sensor, a keypad, a wearable device, and an inertial measurement unit (IMU).

6. The system of claim 1 wherein identifying the at least one feature as a common feature across the different annotated data sets of the plurality of annotated data sets comprises using timestamp information to determine a time of the at least one feature within each of two or more of the annotated data sets.

7. The system of claim 1 wherein identifying the at least one feature as a common feature across the different annotated data sets of the plurality of annotated data sets comprises localizing the at least one feature to a common space within each of two or more of the annotated data sets.

8. A method of providing behavior data for a mixed reality (MR) environment visualization, the method comprising:
obtaining a plurality of sensor data from a plurality of data sources;
processing the obtained plurality of sensor data using a plurality of data analyzers to identify at least one feature;
generating a plurality of annotated data sets, wherein the annotated data sets contain an annotation of the at least one feature;
aggregating the plurality of annotated data sets to identify the at least one feature as a common feature across different annotated data sets of the plurality of annotated data sets, wherein the common feature is used to provide a visualization output representing the MR environment.

9. The method of claim 8 wherein a display unit is controlled based at least on the visualization output.

10. The method of claim 8 wherein the plurality of sensor data from a plurality of data sources comprises source data from each of a plurality of different sensors.

11. The method of claim 8 wherein the plurality of sensor data from a plurality of data sources comprises at least two selected from the list consisting of:
user position data, user motion data, user gaze data, user-object interaction data, and object manipulation data.

12. The method of claim 8 wherein the plurality of different sensors comprises at least two sensors selected from the list consisting of:
a first camera, a second camera aimed to provide stereo vision with the first camera, a third camera oriented differently than the first camera, a microphone, an accelerometer, a gyroscope, a magnetometer, a GPS sensor, a photoreceptive light sensor, a keypad, a state sensor, a wearable device, and an inertial measurement unit (IMU).

13. The method of claim 8 further comprising:
identifying a data type for each data set in the plurality of sensor data obtained;
routing each data set to a corresponding data analyzer of the plurality of data analyzers based on the identified data type and a known data protocol of each data analyzer.

14. The method of claim 8 wherein processing the obtained plurality of sensor data using the plurality of data analyzers further comprises:
parsing the obtained plurality of sensor data according to its own capabilities; and
accepting or rejecting an individual data set for processing based on a data type for an individual data set in the plurality of sensor data obtained.

15. One or more computer storage devices having computer-executable instructions stored thereon for providing behavior data for a mixed reality (MR) environment visualization, which, on execution by a computer, cause the computer to perform operations comprising:
obtaining a plurality of sensor data from a plurality of data sources;
processing the obtained plurality of sensor data using a plurality of data analyzers to identify at least one feature;
generating a plurality of annotated data sets, wherein the annotated data sets contain an annotation of the at least one feature; and
aggregating the plurality of annotated data sets to identify the at least one feature as a common feature across different annotated data sets of the plurality of annotated data sets, wherein the common feature is used to provide a visualization output representing the MR environment.

16. The one or more computer storage devices of claim 15 wherein the plurality of sensor data from a plurality of data sources comprises source data from each of a plurality of different sensors.

17. The one or more computer storage devices of claim 15 wherein the plurality of sensor data from a plurality of data sources comprises at least two selected from the list consisting of:
user position data, user motion data, user gaze data, user-object interaction data, and object manipulation data.

18. The one or more computer storage devices of claim 15 wherein the plurality of different sensors comprises at least two sensors selected from the list consisting of:
a first camera, a second camera aimed to provide stereo vision with the first camera, a third camera oriented differently than the first camera, a microphone, an accelerometer, a GPS sensor, a photoreceptive light sensor, a keypad, a wearable device, and an inertial measurement unit (IMU).

19. The one or more computer storage devices of claim 15 wherein identifying the at least one feature as a common feature across the different annotated data sets of the plurality of annotated data sets comprises using timestamp information to determine a time of the at least one feature within each of two or more of the annotated data sets.

20. The one or more computer storage devices of claim 15 wherein identifying the at least one feature as a common feature across the different annotated data sets of the plurality of annotated data sets comprises localizing the at least one feature to a common space within each of two or more of the annotated data sets.

* * * * *